April 5, 1966  L. O. LOHMEYER, JR., ETAL  3,244,044
VARIABLE ANGLE STRIP SHEARING APPARATUS
Filed Dec. 23, 1963  3 Sheets-Sheet 1

INVENTORS
LLOYD O. LOHMEYER, JR.
LAWTON H. PARSONS
BY Howson & Howson
ATTYS.

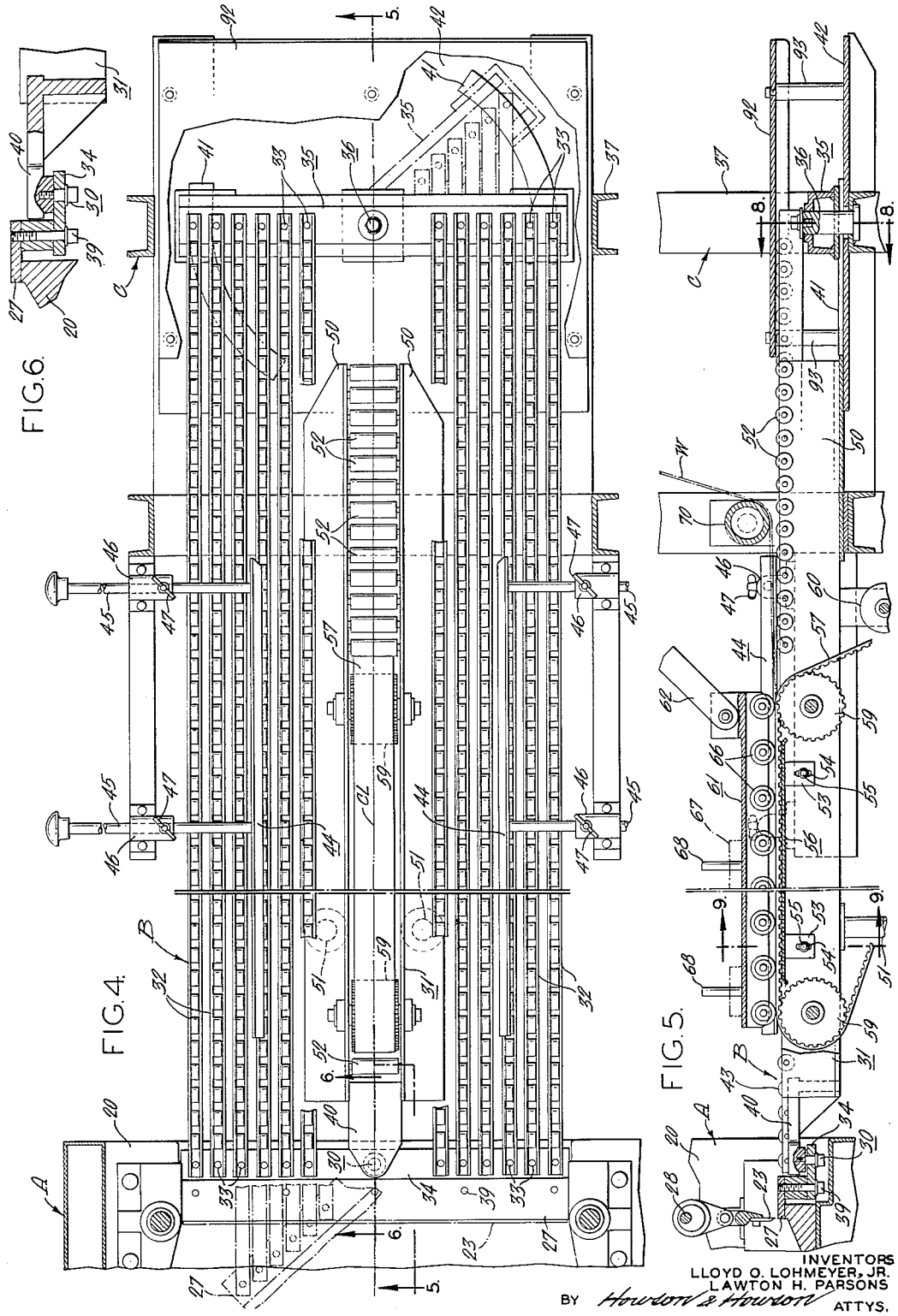

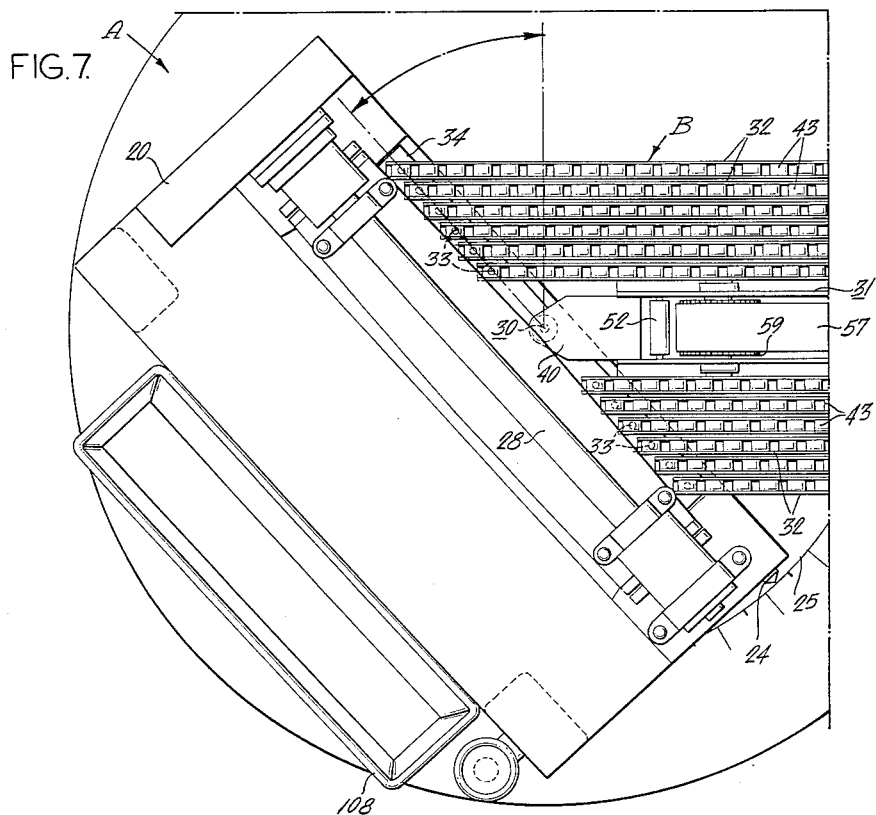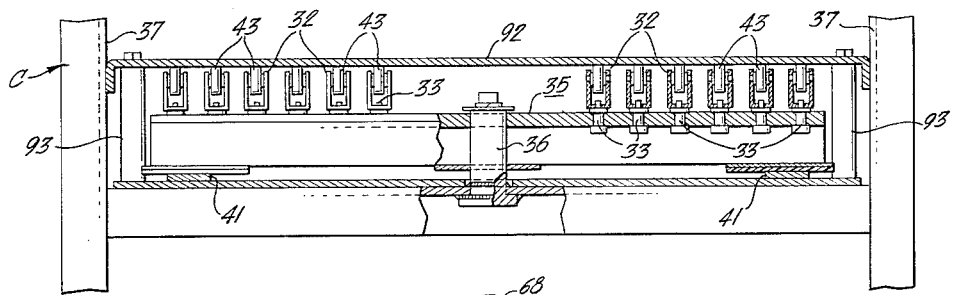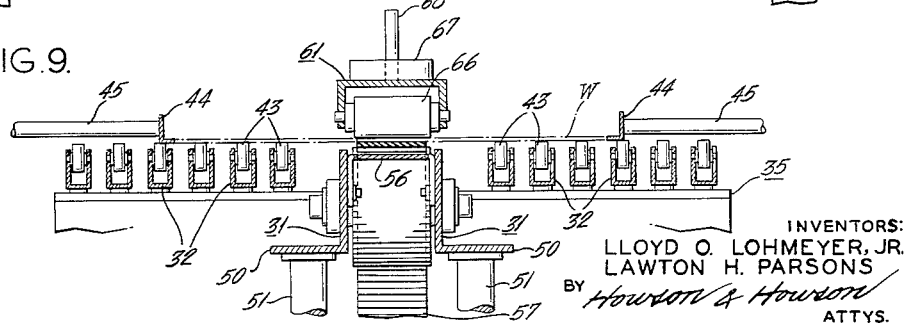

United States Patent Office 3,244,044
Patented Apr. 5, 1966

3,244,044
VARIABLE ANGLE STRIP SHEARING
APPARATUS
Lloyd O. Lohmeyer, Jr., 7705 Cresheim Road, Philadelphia, Pa., and Lawton H. Parsons, 333 Bethlehem Pike, Ambler, Pa.
Filed Dec. 23, 1963, Ser. No. 332,624
8 Claims. (Cl. 83—202)

This invention relates to variable angle strip shearing apparatus and has for an object the provision of improvements in this art.

The apparatus has been developed for cutting woven gasket sheet material of variable widths at various angles and various lengths and wherever reference is made to specific strip material it will be to strips of gasket sheet material.

One of the particular objects of the invention is to provide an angularly adjustable shearing device for cutting off a strip of material at various selected angles.

Another object is to provide a strip or workpiece supporting table which provides full support for the strip in any angular adjusted position of the shearing device.

Another object is to provide a workpiece supporting table which provides full support for strips of different widths.

Another object is to provide strip feed means associated with the table for positively feeding selected lengths of strip material of any width and for any angularly adjusted position of the shearing device.

Another object is to provide convenient means for adjusting the length of material which is fed forward to be cut.

Another object is to provide means for automatically operating the shearing device each time a predetermined length of strip material is fed forward.

Another object is to provide means for winding up a protective sheet which is wound up with the roll of strip material which is fed off and cut, the protective sheet being unwound with it.

The above and other objects together with various features of novelty and advantages will be apparent from the following description of any exemplary embodiment, reference being made to the accompanying drawings, wherein:

FIG. 4 is an enlarged partial horizontal section taken on the line 4—4 of FIG. 2;

FIG. 5 is a vertical longitudinal section taken on the line 5—5 of FIG. 4;

FIG. 6 is an enlarged partial vertical section taken on the line 6—6 of FIG. 4;

FIG. 7 is an enlarged partial plan view of parts shown at the left of FIG. 1 but with the shearing device in a different position.

FIG. 8 is an enlarged vertical transverse section taken on the line 8—8 of FIG. 5;

FIG. 9 is an enlarged vertical transverse section taken on the line 9—9 of FIG. 5.

Figure 1:
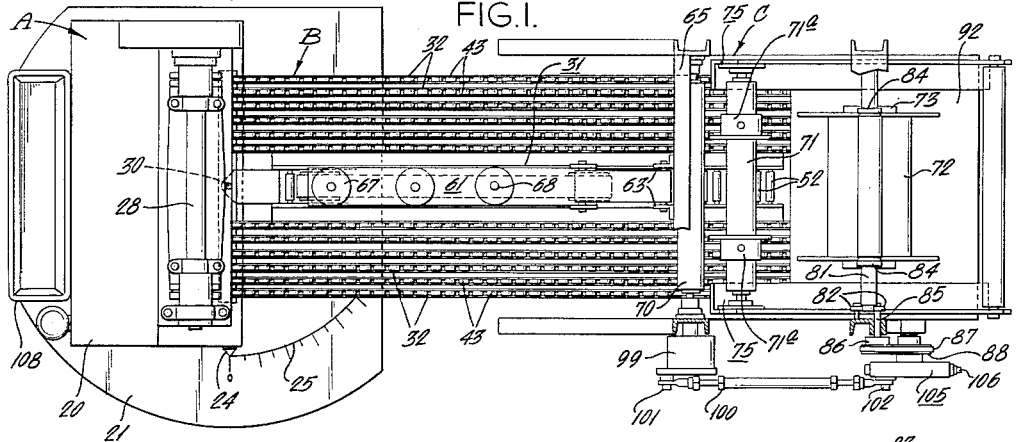
FIG. 1 is a top plan view of apparatus embodying the invention.

The apparatus shown in the drawings comprises an angularly adjustable shearing device A, a strip supporting and feed table B, and a spool supporting and feed drive unit C.

The shearing device A includes a base 20 turnably mounted on a floor plate 21, as upon a fixed journal pin 22. The angular position of the base 20 and of the shearing blade 23 (FIG. 5) is indicated by a pointer 24 and arcuate scale 25. The base 20 is locked in adjusted positions by a floor engaging clamp 26.

Figure 3:
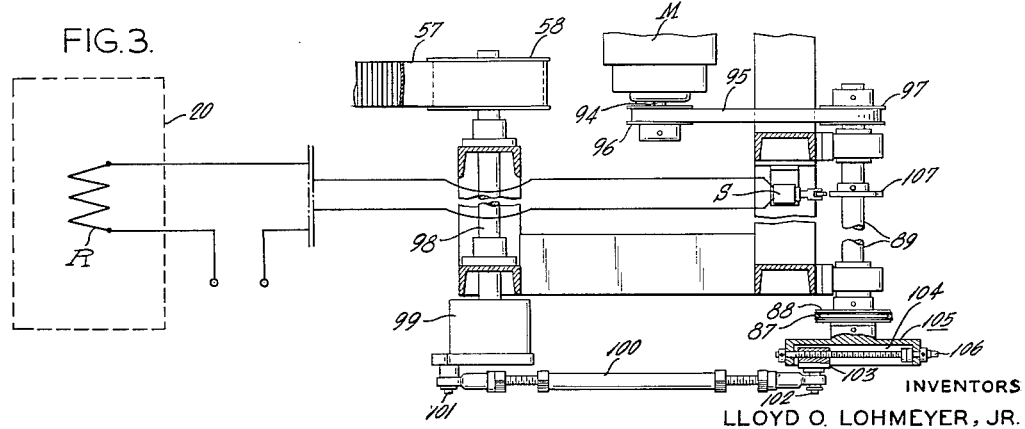
FIG. 3 is an enlarged partial horizontal section taken on the line 3—3 of FIG. 2.

The shearing blade 23 coacts with a fixed shearing edge 27 and is operated by a power driven shaft 28 from one-stroke mechanism by a power motor (not shown) housed in the base 20. FIG. 3 indicates diagrammatically the control for the one-stroke operation in the form of a relay or solenoid coil R in a power line with a cam operated switch S which will be described later, it being noted here that the switch S is operated each time a length of strip is fed forward to be cut.

Figure 2:
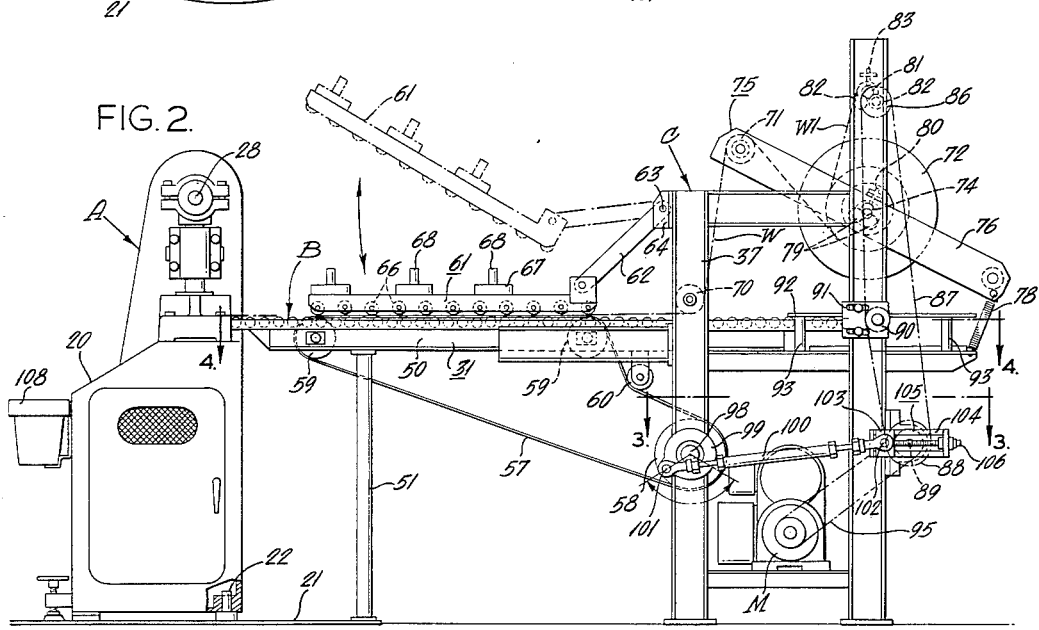
FIG. 2 is a side elevation.

As shown in FIGS. 1 and 2, the forward end of the table B (with reference to the direction of feed of strip material to be cut) is mounted on a supporting pivot pin 30 (FIGS. 5 and 6) carried by the shear base 20, the pivot pin 30 having its axis aligned with the axis of the journal pin 22 of the shear base. The shearing line between the blade 23 and the fixed edge 27 does not pass through the turning axis of the shear base but is always parallel to a given diameter through the turning axis, hence the angular position of the base determines the angle of the cut to be made. The line of cut is located so close to the axis of turning that there is no need to take it into account except for changing the length of pieces cut from the strip and this is easily and quickly done by actual measurement of cut strip as length adjustments are made.

As best shown in FIG. 4, the table B comprises a relatively narrow fixed central table portion 31, to be described later, and movable side portions each comprised of longitudinal rails or bars 32 pivoted at their ends by pivot pins 33 to swingable supporting bars 34 (front) and 35 (rear). The front bar 34 is rigidly secured to the shear base 20, as by screws 39, and turns with it about the front pivot pin 30 and the rear bar 35 is mounted on a fixed pivot pin 36 carried by a frame 37 of the unit C.

The rails 32 are all of the same length and are connected to the supporting bars 34 and 35 at equal distances apart, hence the rails and their support bars form a parallelogram arrangement which is adjusted automatically whenever the shearing device is turned angularly and always maintains a connection without a gap with the shearing device. The central portion 31 of the table, though fixed in position, is relatively so narrow that, being connected to the pivot pin 30 (FIG. 6), it needs no adjustable bridge.

At the rear end the outer parallelogram table portion is supported on arcuate wear plates 41 (FIGS. 6 and 8) carried by a fixed transverse frame member or plate 42. Each table rail 32 is relatively deep and rigid and carries a plurality of strip or workpiece supporting rollers 43, all together forming a rollerway conveyor for the sides of the strip.

Strip side guide bars 44, mounted on supporting rods 45 slidable in fixed guides 46 and held fixed in position by clamp screws 47, accommodate for the width being fed and hold it in a central position relative to a center line CL through the pivots 30 and 36.

The central table portion 31, (FIGS. 2, 4, 5 and 9) comprises laterally spaced rigid side beam members (as L-bars, FIG. 9) 50 mounted on posts 51 near the front end and on one or more cross members of the rear frame at the rear end. For a distance from the rear end the beam members 50 carry workpiece supporting rollers 52. One roller 52 is placed near the front end.

Intermediate its ends the central table portion has mounted between its beams, as by side tabs 53 with slots 54 and held in adjusted position by clamp screws 55, a support plate 56 over which travels a strip or workpiece supporting drive belt 57. The belt is positively driven, as by toothed projections (being of the timer belt type) and a toothed drive sprocket 58 (FIG. 2), and passes over supporting toothed rolls or sprockets 59 at the ends of the table plate 56. An adjustable tightening roll 60 is provided for the drive belt 57. The upper surface of the belt 57 is of such a nature that it exerts friction on the strip to move it forward.

In order to make the drive friction of the belt 57 effective and positive a hold-down device 61 is provided. The hold-down device 61 is supported on arms 62 mounted on pivot pins 63 carried by brackets 64 secured to a transverse beam 65 of the frame 37. On its lower side the hold-down device is provided with rolls 66 which bear upon the upper surface of the workpiece strip. The weight of the hold-down device is adjustable by apertured weights 67 dropped upon upstanding pins 68, the number of weights being selected according to need.

The workpiece strip W (FIG. 5) advances beneath the hold-down device over a transverse idler roll 70, and an idler tension roll 71 from a spool of material 72 held tightly between adjustable positioning cone collars 73 secured on a supporting shaft 74. The tension roll 71 is carried on a frame 75 having side bars 76 pivoted on the frame 37 by pivot pins 77, the frame being biased to urge the roll 71 upward by one or more springs 78. The roll 71 has adjustable strip side guides 71a.

The spool supporting shaft 74 is mounted at its ends for quick shifting on trunnion rolls 79; and the shaft 74 is held down at its ends by screws 80 threaded in suitable brackets and having friction tips, as of nylon, to exert hold-back friction on the shaft and thereby on the spool. In the present embodiment the shaft 74 and its trunnion rolls 79 and the hold-down screws 80 are carried by the side bars 76 of the frame 75.

As mentioned above, the strip W, as received on the spool 72, may have a protective sheet strip W1 wound therewith. In order to remove this protective wrapper sheet W1, when unwound with the strip W, there is provided an upper wind-up shaft 81 mounted on trunnion rolls 82 and held down with friction by screws 83, the shaft 81 having adjustable cone collars 84 for guiding the wrapper sheet centrally. The shaft 81 is frictionally driven at a speed great enough to take up all necessary strip length even when winding at the smallest diameter on the shaft and to provide slip when the top shaft rotation speed is not needed. For this purpose, one of the trunnion rolls 82 has a friction surface, as of rubber, engaging the shaft and is provided with a shaft 85 mounted in a suitable bearing and having thereon a pulley 86. The pulley 86 is driven by a belt 87 from a pulley 88 on a main drive shaft 89. An idler pulley 90 carried on an adjustable bracket 91 regulates the tension on the belt.

A plate 92 is mounted above the rear ends of the rails 32 and below the spool 72 to support the ends of the tapes W and W1 if they should hang down before being threaded up for use, the plate 92 being mounted on supports 93 carried by the frame. The plate 92 may be disposed where the rollers 43 will engage beneath it to assist in keeping the rails in a smooth horizontal disposition.

The main drive shaft 89 is driven by a motor M, with a gear drive unit if needed, and with speed adjustment of integrated design for the motor. The drive from the motor (or gear box) shaft 94 to the main drive shaft 89 is positive, as by a cleated timer-type belt 95 operating on a sprocket 96 on the motor shaft and a sprocket 97 on the main drive shaft 89.

As shown in FIGS. 2 and 3, the sprocket pulley 58 which drives the strip feed belt 57 is mounted on a shaft 98 turnably supported in suitable bearings on the frame, the shaft 98 being driven in intermittent steps in a forward direction by a one-way roller clutch device 99 carried by the shaft.

The outer casing of the one-way drive device 99 is oscillated by an adjustable length connecting rod 100 connected at one end to a crank pin 101 carried by the casing of the one-way drive device and connected at the other end to a rotatable crank pin 102 carried by a radially adjustable slide block 103 mounted in a guide 104 of a rotary disk 105 secured to the end of the main drive shaft 89, the block being adjusted and held in its guide by an adjusting screw 106.

The greatest throw of the adjustable drive crank pin 102 is not sufficient to turn the feed belt drive shaft 98 through a complete revolution, hence it will always oscillate, the arc of maximum oscillation being indicated in FIG. 2, and at each forward drive movement through the one-way drive clutch device 99 will drive the feed belt and strip carried thereby a given distance forward.

At the end of the forward feed movement of a strip the shear blade will be caused to operate, as through the actuation of the switch S by a cam 107 secured on the main drive shaft 89. While the cam 107 is shown to be mounted on the main drive shaft where it will cause actuation of the shear blade for each revolution of the main drive to cut relatively short lengths of material, it may, if necessary to cut longer lengths, be mounted on a secondary shaft geared to turn more slowly than the main drive shaft so that more than one increment of length of material is fed forward by more than one rotation of the main drive shaft before the signal at switch S to cut off a length is given.

It is assumed that the strip to be cut is relatively stiff so that it will move forward without buckling after it passes the hold-down and feed device (61 and 58) but if the material to be fed is less stiff the front end of the hold-down and feed device could be extended forwardly at the front end considerably.

In operation, the strip feed and cutting action will be as described. If the strip is narrow it will travel on the central fixed table alone; but if the strip is wide its sides will be supported on the rollers of the parallelogram side table rails with forward drive at the center by the center table hold-down and drive device the same as a narrow strip. The parallelogram rails will always, in any and all angularly adjusted positions of the shearing device, form a full bridging support for any width of strip being fed which requires side support. It will be noted that the parallelogram rail arrangement extends back at the rear end sufficiently beyond the feed-in roll 70 of the strip W that the strip of any width finds support for its full width even in the most extreme angularly adjusted positions of the shearing device and of the parallelogram table device which is adjusted in position when the shearing device is adjusted.

The hold-down device 61 can be readily lifted for threading up a sheet; and, if desired, a cable or rope may be attached to the hold-down device to hold it up while threading up, the cable passing over an overhead sheave and having a weight attached to its other end.

It is thus seen that a strip cut-off apparatus has been provided which will cut off pieces at different angles; which will fully support strips of different widths in all adjusted positions; will cut different lengths as needed; which will feed and cut off material automatically when started into operation, the cut material, if desired, falling into a removable box 108; and which is relatively simple, sturdy and dependable.

While one embodiment of the invention has been described for purposes of illustration, it is to be understood that there may be various embodiments and modifications within the general scope of the invention.

We claim:

1. Strip shearing apparatus, comprising in combination, a shearing device turnable about a vertical axis to various adjusted angular cut-off positions, a table upon which material is fed medially along a center line which intersects said vertical turning axis of the shearing device, said table including a plurality of spaced parallel table bars pivoted to a part movable with said shearing device to form a strip supporting bridge in any turned position of the shearing device.

2. Apparatus as set forth in claim 1, in which said table bars are of equal length and are pivoted at their rear ends to a transverse bar which is mounted on a pivot on the said center line of travel of the strip, said bars and the parts to which they are pivoted forming a parallelogram arrangement in which the table bars are kept parallel in all turned positions of the shearing device.

3. Apparatus as set forth in claim 1, in which said table bars are provided with rollers along their length for supporting the advancing strip therein.

4. Apparatus as set forth in claim 1, which further includes a fixed central table portion for supporting the center of the strip between said table bars, and means on said central table portion for feeding said strip forward.

5. Apparatus as set forth in claim 4, in which said strip feeding means comprises a positively driven belt which is held in engagement with the strip, and means for advancing said belt and strip in increments of length.

6. Apparatus as set forth in claim 5, which includes a continuously turning drive shaft and intermittent drive means for advancing said belt, and means operated conjointly with said drive shaft for causing said shearing device to cut a length from the strip when it has been advanced a predetermined distance by the incremental feeding action of said belt.

7. Apparatus as set forth in claim 5, which includes a swingable weighted hold-down device for holding the strip down against the belt.

8. Apparatus as set forth in claim 7, in which rollers are provided beneath said hold-down device for engaging the strip.

References Cited by the Examiner

UNITED STATES PATENTS

| 910,325 | 1/1909 | Sill | 242—56 |
| 2,933,003 | 4/1960 | Wheeler et al. | 83—422 |

FOREIGN PATENTS 667,780   3/1952   Great Britain.

WILLIAM W. DYER, Jr., *Primary Examiner.*

ANDREW R. JUHASZ, *Examiner.*